United States Patent [19]

Lallier

[11] Patent Number: 6,103,682
[45] Date of Patent: *Aug. 15, 2000

[54] THICK PAINT STRIPPING COMPOSITION

[75] Inventor: Jean-Pierre Lallier, Courbevoie, France

[73] Assignee: Elf Atochem S.A., France

[*] Notice: This patent issued on a continued prosecution application filed under 37 CFR 1.53(d), and is subject to the twenty year patent term provisions of 35 U.S.C. 154(a)(2).

[21] Appl. No.: 09/051,632

[22] PCT Filed: Oct. 14, 1996

[86] PCT No.: PCT/FR96/01600

§ 371 Date: Aug. 19, 1998

§ 102(e) Date: Aug. 19, 1998

[87] PCT Pub. No.: WO97/14757

PCT Pub. Date: Apr. 24, 1997

[30] Foreign Application Priority Data

Oct. 18, 1995 [FR] France .................... 95 12214

[51] Int. Cl.[7] .............. C11D 7/26; C11D 7/32; C11D 7/50
[52] U.S. Cl. .......... 510/212; 510/201; 510/407; 510/434; 510/476; 510/493; 510/499; 510/505; 510/506

[58] Field of Search ................ 510/201, 212, 510/505, 506, 407, 434, 476, 499, 493

[56] References Cited

U.S. PATENT DOCUMENTS

| | | | |
|---|---|---|---|
| 2,694,658 | 11/1954 | Crepeau et al. | |
| 5,612,303 | 3/1997 | Takayanagi et al. | 510/174 |
| 5,753,603 | 5/1998 | Lallier et al. | 510/212 |

FOREIGN PATENT DOCUMENTS

| | | | |
|---|---|---|---|
| 2097488 | 12/1993 | Canada | C09D 9/00 |
| 0 490 726 | 6/1972 | European Pat. Off. . | |
| 0 573 339 | 12/1993 | European Pat. Off. . | |
| 2150587 | 7/1985 | United Kingdom | C11D 7/30 |
| 92 05224 | 4/1992 | WIPO . | |

*Primary Examiner*—Yogendra Gupta
*Assistant Examiner*—Christine Ingersoll
*Attorney, Agent, or Firm*—Millen, White, Zelano & Branigan, P.C.

[57] ABSTRACT

A composition including an aprotic polar solvent such as DMSO, a non-protic water-soluble ether, a water-soluble thickener selected from acrylic acid polymers and an aliphatic amine having 6–20 carbon atoms.

24 Claims, No Drawings

THICK PAINT STRIPPING COMPOSITION

The present invention relates to a thickened composition intended for stripping paints and/or varnishes.

The applications for patents EP 490 726 and EP 573 339 describe stripping compositions comprising an aprotic polar solvent and a non-protic ether. The polar solvent can be dimethyl sulphoxide (DMSO) or N-methylpyrrolidinone (NMP). The ether must be non-protic, i.e. must be devoid of a covalent bond X—H in which X is a heteroatom, and must also have the smallest possible molecular volume. This ether can, for example, be 2-methoxy-1,3-dioxolane. The composition can comprise a thickener such as methylcellulose or an Aerosil (pyrogenic silica).

Moreover, the application for patent GB 2,150,587 describes a composition for stripping paints which comprises methylene chloride, methanol and a copolymer comprising vinyl chloride in the majority and an acrylic ester in the minority, containing free hydroxyl groups. This composition must also include a thickener in order to obtain proper viscosity and good adhesion. This thickener is advantageously a polymer of acrylic acid in combination with a saccharide of the type sold by the company B.F. GOODRICH under the trademark Carbopol® and, in particular, the Carbopols® 940, 941 and 934 and their technical equivalents in the 800 series.

The thickeners of this type are employed together with a neutralizing amine, generally an aliphatic amine having 6 to 20 carbon atoms. The amine is advantageously liquid at ambient temperature. Among these amines particular emphasis is given to C8 to C14 N,N-dimethylated amines, such as N,N-dimethyltetradecylamine.

This composition, which is based on methylene chloride (solvent), also contains from 0.05 to 0.1% of a wax in order to counter the evaporation of the solvent, and a small quantity of water which is required for the formation of hydrogen bonds with the thickener of the Carbopol® type, the latter being present in a quantity by weight of from 0.3 to 1%, for example from 0.5 to 0.6% by weight relative to the weight of the composition.

The application for patent WO 92/05224 describes a composition for stripping paints, varnishes and the like which does not have a chlorinated solvent and which possesses an effective rheology identical to that of a paint.

Although the composition can be devoid of acetic acid and water, the most preferred composition nevertheless comprises the following liquid ingredients, listed as a volume percentage of the final composition:

| | |
|---|---|
| Dibasic ester of aliphatic acid | 48% |
| N-methyl-2-pyrrolidinone | 15% |
| Mixture of propylene glycol methyl ether and dipropylene glycol methyl ether | 20% |
| Acrylic polymer | 5% |
| Water | 5% |
| Acetic acid | 2% |

The preferred dibasic ester is commercially available under the name D.B.E. (DuPont Chemicals Inc.).

The function of the acrylic polymer is to enhance the rheology of the composition. These liquids are preferably mixed with a thickener in order to form a gel. The thickener is preferably hydroxypropyl methylcellulose, employed in a content of approximately 1%. Other fillers may be added to this gel, such as polymers, titanium dioxide and colorants.

This latter composition of the prior art comprises glycol ethers, which are protic owing to the presence of free OH groups, and aliphatic diesters in a considerable percentage, 48%. These diesters are insoluble in water, which may give rise to difficulties in rinsing the substrate after it has been stripped of its coats of paint.

The aim of the present invention is to provide a paint-stripping composition in the form of a thickened formulation which is devoid of halogenated products and is more effective in terms of its speed of action on coats of paint than the compositions of the prior art. In addition, this thickened formulation should not separate during the stripping period, even in a moist atmosphere, must be easy to apply by brush or roller and, finally, must be easily rinsable with water.

This aim is achieved by a thickened composition which is intended for the stripping of paints and/or varnishes and is characterized in that it comprises:

a/ an aprotic polar solvent in a quantity of from 1 to 100 parts by weight, b/ a non-protic water-soluble ether in a quantity of from 1 to 100 parts by weight, c/ a water-soluble thickener selected from polymers based on acrylic acid, in a quantity of from 0.002 to 10 parts by weight, d/ an aliphatic amine having 6 to 20 carbon atoms.

Advantageously, the aprotic polar solvent is selected from dimethyl sulphoxide (DMSO), dimethylformamide (DMF), 1-methyl-2-pyrrolidinone (NMP), 4-methylmorpholine, α-butyrolactone, acetonitrile, ethylene carbonate, propylene carbonate, and mixtures thereof.

Preferably, the aprotic polar solvent is DMSO.

Preferably, the water-soluble ether has a molar volume of less than 200 $cm^3 \cdot mol^{-1}$.

By molar volume is meant, in the present description and in the corresponding claims, the ratio of the molar mass of the water-soluble ether, expressed in grams per mole, to the specific mass ρ of the same ether, expressed in grams per $cm^3$. The molar volume is therefore expressed in $cm^3 \cdot mol^{-1}$. This definition can be found in the document "Handbook of solubility parameters and other cohesion parameters, Second Edition (1991), Chapter 7, p. 196 CRC Press, Allan F. M. Barton".

Advantageously, the non-protic water-soluble ether is selected from ether esters, diethers, ether ketones, especially 1,4-dioxane, 2-methoxy-1,3-dioxolane, 1,3,5-trioxane, 1,3-dioxolane, methyl methoxyacetate, methyl 3-methoxypropionate (MMP), dipropylene glycol dimethyl ether (DPGDME) and propylene glycol methyl ether acetate (PGMA).

Among the above ethers it is possible with advantage to select MMP, since it provides excellent stripping activity; however, PGMA is particularly preferred owing to its very low mammalian toxicity, despite the fact that its activity is inferior to that of MMP.

The water-soluble thickener is selected from polymers based on acrylic acid.

These polymers are neutralized by the addition of aliphatic amines having 6 to 20 carbon atoms, for example dodecylamine or 2-ethylhexylamine. The regulation of the quantity of amine added makes it possible to obtain the desired rheology with, in particular, a good hold of the stripper on vertical walls which avoids the phenomenon of runs.

The preferred compositions according to the present invention comprise the following mixtures:

| | |
|---|---|
| DMSO: | approximately 48 parts by weight |
| PGMA: | approximately 48 parts by weight |
| Carbopol ® 672: | approximately 2 parts by weight |
| Dodecylamine: | approximately 1.6 parts by weight, or |
| 2-Ethylhexylamine: | approximately 1 part by weight. |

The thickened composition according to the present invention may also comprise conventional additives, for example a non-halogenated co-solvent, an activator, a flameproofing agent, a stabilizer, a surfactant, titanium dioxide, a dye.

This thickened stripping composition can be used on any type of paint and/or varnish covering a substrate, for example on glycero-aliphatic, urethane alkyd, epoxy or polyester paint. The substrate can be of wood, metal, cement, plaster or any material which is relatively insensitive to the action of the said composition. Preferably, the paint to be stripped is within the construction sector.

The mode of use of the composition is conventional. The article or surface to be stripped is brought into contact with the composition by various means, for example brush or applicator roller. This contact is effected at ambient temperature or a temperature ranging from 5 to 30° C. The contact time is generally between 15 and 45 minutes for thin coats of paint and/or varnish and from 1 hour to several hours for thick coatings.

The present invention will be more readily understood with the aid of the examples which follow and which describe, in particular, the preferred compositions.

EXAMPLES

1—General procedure

For the use of the compositions in the industrial sector, paints from the automotive industry were employed. The paints are Blanc Glacier (Glacier White) 389 polyester paints from HERBERTS, supplied by the company ETALON (France). The thickness of the coating is from 35 to 45 µm. The metal panels used are made of phosphated steel and have a rectangular covered surface of 90×190 mm.

For use in the sector of construction, the general public or the professional sector, glyptal resin paints on wood were used. More exactly, 4 coats of glyptal resin paints were applied in succession to plywood panels having a rectangular surface of 200×200 mm. The first coat is black, the second yellow, the third green and finally, the fourth coat, visible at the surface of the panel, is red.

The thickened composition is applied to the two above types of panel and is then spread uniformly in a thin coat with the aid of a metal doctor blade. A stopwatch is then started. After a certain period, generally 15 minutes, the paint is scraped with a trowel and the appearance of the substrate is observed. In the case of an industrial paint of the polyester type, the time taken for the film to lift from the steel panel is measured.

2—Glyptal resin paint (4 coats on wooden plywood panel).

Two formulations were compared:

a comparative formulation $F_1$ which does not fall within the scope of the present invention, having the following composition:

| | |
|---|---|
| DMSO: | 30 parts by weight |
| Anisole: | 70 parts by weight |
| Thickener (Methocell ® 311): | 1.3 parts by weight. |

Methocell® 311 marketed by the company DOW CHEMICAL Co. (USA) and the process for obtaining it is featured in the U.S. Pat. No. 3,388,082: "Hydroxypropyl methyl cellulose ethers":

a formulation $F_2$ according to the invention:

| | |
|---|---|
| DMSO: | 50 parts by weight |
| Propylene glycol methyl ether: acetate (PGMA) | 50 parts by weight |
| Thickener Carbopol ® 672: | 2 parts by weight |
| 2-Ethylhexylamine: | 1.7 parts by weight. |

Carbopol® 672 is marketed by the company B.F. GOODRICH Co. (USA) and the process for obtaining it is described in the U.S. Pat. No. 4,419,502: "Polymerization process for carboxyl-containing polymers".

Following application of each of the formulations $F_1$ and $F_2$, after 5 minutes, the formulation $F_1$ starts to show separation of its components. If the painted panel is placed vertically, a number of liquid drops are observed to flow. In contrast, the formulation $F_2$ does not exhibit these disadvantages.

After 15 minutes, the 2 panels are scraped with the trowel. In both cases the colours yellow and green appear on each panel. $F_1$ and $F_2$ therefore have comparable efficacy on this paint.

The panels are then rinsed under a jet of water.

With $F_1$, the immediate formation of a sticky film (of latex type) is observed, which is difficult to remove. With $F_2$, the thickened composition dissolves readily without causing any problem of adhesion.

3—Polyester paint on steel panels

In addition to the formulations $F_1$ and $F_2$, four other formulations were prepared ($F_3$ to $F_6$). $F_3$ to $F_6$ all contain:

| | |
|---|---|
| DMSO: | 50 parts by weight |
| Water-soluble ether: | 50 parts by weight |
| Carbopol ® 672: | 2 parts by weight |
| 2-Ethylhexylamine: | 1.5 to 2 parts by weight. |

Only the nature of the water-soluble ether changes:

| | |
|---|---|
| $F_3$: | 1,4-dioxane |
| $F_4$: | 1,3-dioxolane |
| $F_5$: | Tetrahydrofuran |
| $F_6$: | Methyl 3-methoxypropionate |

The results appear in Table I below:

TABLE I

| FORMULATIONS | LIFTING TIME in minutes |
|---|---|
| $F_1$ | 10 |
| $F_2$ | 20 |
| $F_3$ | 20 |
| $F_4$ | 20 |
| $F_5$ | 5 |
| $F_6$ | 20 |

*Comparative

4—Preferred formulations $F_7$ and $F_8$.

The formulation $F_7$ comprises:

| | |
|---|---|
| DMSO: | 48.2 parts by weight |
| PGMA: | 48.2 parts by weight |
| Carbopol ® 672: | 2 parts by weight |
| Dodecylamine: | 1.6 parts by weight |

The formulation $F_8$ comprises:

| | |
|---|---|
| DMSO: | 48.575 parts by weight |
| PGMA: | 48.575 parts by weight |
| Carbopol ® 672: | 2 parts by weight |
| 2-Ethylhexylamine: | 0.85 part by weight. |

$F_7$ leads to performances similar to those of $F_2$ while having a slightly lower viscosity, which facilitates its use. Moreover, dodecylamine is less toxic to mammals.

$F_8$ leads to performances similar to those of $F_2$ while having a slightly lower viscosity, which likewise facilitates its use. Moreover, 2-ethylhexylamine has the advantage of having a much lower crystallization point (−76° C.) than dodecylamine (+26° C.), which results in a much lower viscosity even at low temperature.

What is claimed is:

1. A thickened composition intended for the stripping of paints and/or varnishes, which, comprises:

a/ an aprotic polar solvent in a quantity of from 1 to 100 parts by weight, b/ a non-protic water-soluble ether in a quantity of from 1 to 100 parts by weight, c/ a water-soluble thickener selected from the group consisting of polymers based on acrylic acid, in a quantity of from 0.002 to 10 parts by weight, d/ an aliphatic amine having 6 to 20 carbon atoms, with the provision that the aprotic polar solvent (a) is different from the non-protic water-soluble ether (b) and with the provision that the composition is devoid of halogenated components.

2. A composition according to claim 1, wherein the aprotic polar solvent is selected from dimethyl sulphoxide (DMSO), dimethylformamide (DMF), 1-methyl-2-pyrrolidinone (NMP), 4-methylmorpholine, α-butyrolactone, acetonitrile, ethylene carbonate, propylene carbonate, and mixtures thereof.

3. A composition according to claim 2, wherein the aprotic polar solvent is dimethyl sulphoxide.

4. A composition according to claim 1, wherein the water-soluble ether has a molar volume of less than 200 $cm^3 \cdot mol^{-1}$.

5. A composition according to claim 1, wherein the non-protic water-soluble ether is selected from ether esters, diethers, and ether ketones.

6. A composition according to claim 5, wherein the water-soluble ether is MMP.

7. A composition according to claim 5, wherein the water-soluble ether is PGMA.

8. A composition according to claim 1, comprising the following mixture:

(a) DMSO: approximately 48 parts by weight, (b) PGMA: approximately 48 parts by weight, (c) the water-soluble thickener: approximately 2 parts by weight, and (d) dodecylamine: approximately 1.6 parts by weight, or 2-ethylhexylamine: approximately 1 part by weight.

9. In a process of contacting a paint or varnish with a stripping agent to strip the paint or varnish from the substrate, the improvement wherein the stripping agent is in accordance with the composition of claim 1.

10. In a process of contacting a paint or varnish with a stripping agent to strip the paint or varnish from the substrate, the improvement wherein the stripping agent is in accordance with the composition of claim 2.

11. In a process of contacting a paint or varnish with a stripping agent to strip the paint or varnish from the substrate, the improvement wherein the stripping agent is in accordance with the composition of claim 3.

12. In a process of contacting a paint or varnish with a stripping agent to strip the paint or varnish from the substrate, the improvement wherein the stripping agent is in accordance with the composition of claim 4.

13. In a process of contacting a paint or varnish with a stripping agent to strip the paint or varnish from the substrate, the improvement wherein the stripping agent is in accordance with the composition of claim 5.

14. In a process of contacting a paint or varnish with a stripping agent to strip the paint or varnish from the substrate, the improvement wherein the stripping agent is in accordance with the composition of claim 6.

15. In a process of contacting a paint or varnish with a stripping agent to strip the paint or varnish from the substrate, the improvement wherein the stripping agent is in accordance with the composition of claim 7.

16. In a process of contacting a paint or varnish with a stripping agent to strip the paint or varnish from the substrate, the improvement wherein the stripping agent is in accordance with the composition of claim 8.

17. Composition according to claim 2, characterized in that the non-protic water-soluble ether is selected from ether esters, diethers and ether ketones.

18. A composition according to claim 3, wherein the water soluble ether is MMP.

19. A composition according to claim 3, wherein the water soluble ether is PGMA.

20. In a process of contacting a paint or varnish with a stripping agent to strip the paint or varnish from the substrate, the improvement wherein the stripping agent is in accordance with the composition of claim 17.

21. A composition according to claim 5, wherein the non-protic water-soluble ether is selected from the group consisting of 1,4-dioxane, 2-methoxy-1,3-dioxolane, 1,3,5-trioxane, dioxolane, methyl methoxyacetate, methyl 3-methoxypropionate (MMP) and propylene glycol methyl ether acetate (PGMA).

22. A composition according to claim 17, wherein the non-protic water-soluble ether is selected from the group consisting of 1,4-dioxane, 2-methoxy-1,3-dioxolane, 1,3,5-trioxane, dioxolane, methyl methoxyacetate, methyl 3-methoxypropionate (MMP) and propylene glycol methyl ether acetate (PGMA).

23. The composition of claim 1, wherein the water-soluble thickener, (c), is a polymer of an acrylic acid with a saccharide.

24. The composition of claim 23, wherein the aliphatic amine, (d), is dodecylamine or 2-ethylhexylamine.

* * * * *